Dec. 9, 1952

R. MERCER 2,621,255

TELEPHONE SYSTEM WITH CYCLIC ROUTE BUSY TEST

Filed Jan. 7, 1949

8 Sheets-Sheet 1

Inventor
RICHARD MERCER.
By Donald K. Lippincott
Attorney

Dec. 9, 1952 R. MERCER 2,621,255

TELEPHONE SYSTEM WITH CYCLIC ROUTE BUSY TEST

Filed Jan. 7, 1949 8 Sheets-Sheet 2

Inventor
RICHARD MERCER.
By Donald K. Lippincott
Attorney

Dec. 9, 1952 R. MERCER 2,621,255

TELEPHONE SYSTEM WITH CYCLIC ROUTE BUSY TEST

Filed Jan. 7, 1949 8 Sheets-Sheet 3

Inventor
RICHARD MERCER.
By Donald K. Lippincott
Attorney

Inventor
RICHARD MERCER.
By Donald K. Lippincott
Attorney

Dec. 9, 1952 R. MERCER 2,621,255

TELEPHONE SYSTEM WITH CYCLIC ROUTE BUSY TEST

Filed Jan. 7, 1949 8 Sheets-Sheet 5

Inventor
RICHARD MERCER.
By Donald K. Lippincott
Attorney

Dec. 9, 1952 R. MERCER 2,621,255

TELEPHONE SYSTEM WITH CYCLIC ROUTE BUSY TEST

Filed Jan. 7, 1949 8 Sheets-Sheet 6

Inventor
RICHARD MERCER.
By Donald K. Lippincott
Attorney

Dec. 9, 1952 R. MERCER 2,621,255

TELEPHONE SYSTEM WITH CYCLIC ROUTE BUSY TEST

Filed Jan. 7, 1949 8 Sheets-Sheet 7

Inventor
RICHARD MERCER.
By Donald K. Lippincott
Attorney

Inventor
RICHARD MERCER.
By Donald K. Lippincott
Attorney

Patented Dec. 9, 1952

2,621,255

UNITED STATES PATENT OFFICE 2,621,255

TELEPHONE SYSTEM WITH CYCLIC ROUTE BUSY TEST

Richard Mercer, London, England

Application January 7, 1949, Serial No. 69,720
In Great Britain January 16, 1948

7 Claims. (Cl. 179—18)

The present invention concerns improvements in or relating to telephone systems and in particular to telephone systems in which multiposition switching devices are operated to set up a connection.

The expression "multiposition switching device" as used in this specification means an assembly of contact devices, electronic valves, triggered gas discharge tubes or other devices each individually capable of being selected to set up a connection, the operative elements of such a switching device being either adapted to take up different positions according to the selection to be effected or to be located in different positions to be selectively operated.

One form of multiposition switching device which is hereinafter referred to by the prefix word "traversing" includes a set of wipers or contact arms which are caused to travel to take up any of several positions and by engagement with or operation of a set of contacts in the position taken up perform the desired selection.

Another form of multiposition switching device which is hereinafter referred to by the prefix word "static" includes a plurality of operative elements located in various positions which are themselves selected in accordance with the selective action desired such as a set of relays or a cross bar switch the magnets of which are selected in accordance with the connection to be set up or a set of thermionic valves the grids of which are selected in accordance with the connection to be set up and the like. It is to be noted that while usually the components of a multiposition switching device form a unit assembly this is not essential in the case of a static multiposition switching device which includes a plurality of similar components where the linkage between components may be by electric conductors.

The principal object of the invention is the provision of a simplified system whereby the total number of switching positions in an exchange or network capable of handling a given volume of traffic can be appreciably reduced. The expression "switching position" applies to each position of a multiposition switch for instance, the number of contact sets and the total number may be reduced either by reducing the number of switching stages, the number of switching devices or the number of contact sets or their equivalent or combinations thereof.

According to one feature of the invention groups of multiposition switching devices are provided arranged in tandem for setting up connections, an idle route including a multiposition switching device from each group is first selected for the purpose of setting up a desired connection and subsequently the multiposition switching devices of the selected route are operated successively over control circuits extending from one multiposition switching device to the next over the route selected.

According to another feature of the invention groups of multiposition switching devices are provided for setting up a connection which devices are arranged in such a way that a given connection may be set up over different routes each including a series of multiposition switching devices in tandem, means being provided for selecting a route in which all the multiposition switching devices of the route are idle and subsequently operating said multiposition switching devices successively by controls predetermined for said connection whereby automatic hunting between switching stages is avoided.

According to a third feature of the invention the outlets of each multiposition switching device of a group are connected to multiposition switching devices of a second group in such a way that a plurality of distinct routes including a multiposition switch of each group can be used to set up a given connection, means being provided for finding idle multiposition switching devices of each group which are adapted to set up said connection and thereafter operating said multiposition switching devices successively.

According to a fourth feature of the invention impulse responding equipment taken into use on the initiation of a call includes means for testing for an idle route through multiposition switching devices in a plurality of groups in tandem whereby a desired connection may be set up and means which when an idle route is found establish connection to a multiposition switching device of one group over which the desired connection can be established and subsequently operating over the connection established to said multiposition switching device the multiposition switching devices forming the idle route.

According to a fifth feature of the invention a plurality of groups of multiposition switching devices are arranged in tandem each group having a common lead which is marked in accordance with the idle or busy condition of each multiposition switching device of a group at distinctive instants in a cycle, control equipment being provided by which the desired connection is to be extended comprising means for selecting a common lead from each of the groups of multiposition switching devices over which the desired connection may be extended and means operating in response to the marking of said common leads to select an idle multiposition switching device of one group having access to an idle multiposition switching device of another group or groups through which the desired connection may be extended and thereafter operating each multiposition switching device successively to extend the connection in the required direction.

According to a sixth feature of the invention test circuits for the multiposition switching devices used in setting up a connection are completed when sufficient digits have been dialled to effect the setting up of a connection up to but not including the final stage of such switching devices.

According to a seventh feature of the invention a telecommunication system comprises a plurality of groups of multiposition swiching devices arranged in tandem and impulse responding equipments an idle one of which is adapted to be seized when a call is initiated said equipments including means for storing the digits dialled by a calling party, means responsive to certain of said digits to select a test lead or leads whereby the idle or busy conditions of each of a group or groups of multiposition switching devices may be ascertained, means responsive to control over the selected test lead and a further test lead which serves to indicate the idle or busy condition of each of another group of multiposition switching devices for selecting and establishing connection with an idle one of said other group of multiposition switching devices which has access to an idle multiposition switching device or idle multiposition switching devices in tandem selected from said first mentioned group or groups and means for controlling the selected idle multiposition switch of said other group over said established connection to establish connection with the idle multiposition switch to which it has access and subsequently controlling over said established connection and over said idle multiposition switch of said other group said idle multiposition switch to which it has access.

According to an eighth feature of the invention a telecommunication system is provided in which on the initiation of a call impulse responding equipment is taken into use independently of multiposition switches used in extending a call, and in which after certain digits dialled by a calling party have been registered a test is made for idle multiposition switches which are connected in tandem and over which a desired call may be extended whereupon the idle multiposition switches are operated successively from said impulse responding equipment to set up the call and subsequently the calling line is connected to the first multiposition switch and the impulse responding equipment released.

The multiposition switching devices in accordance with the invention may be either of the motor driven or static types. In the arrangement described herein by way of example, the multiposition switching devices used for setting up a connection are of the traversing type while those used for selecting and establishing connection between the calling line and the impulse responding equipment and between the impulse responding equipment and the first multiposition switch of an idle route and between the calling line and the first multiposition switch of an idle route are of the static type.

Further a cyclically operated multiposition switch used for providing marking potentials at different instants of time in a cycle to enable a common lead to be marked with the busy or idle condition of each of a number of switching devices of a group is conveniently of the static type.

These and other features of the invention will be better understood from the following description taken in conjunction with the accompanying drawings which show sufficient circuits of a telephone system according to the invention to enable the invention to be understood.

Figure 8:
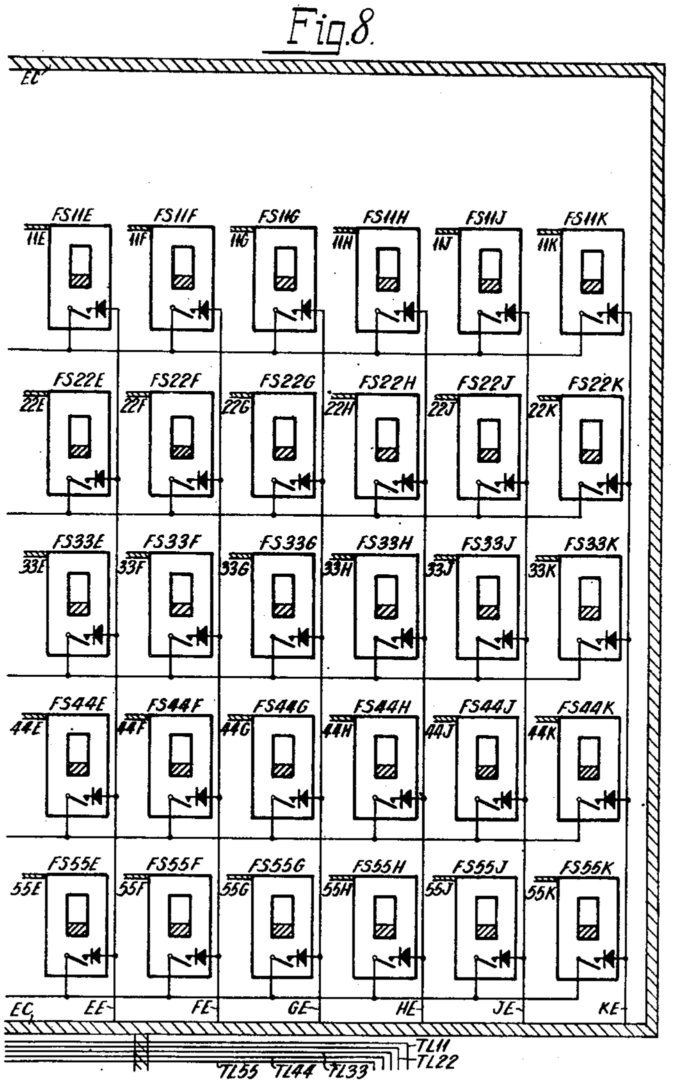

Fig. 8 diagrammatically represents six further final selectors; and

Figures 1, 9:
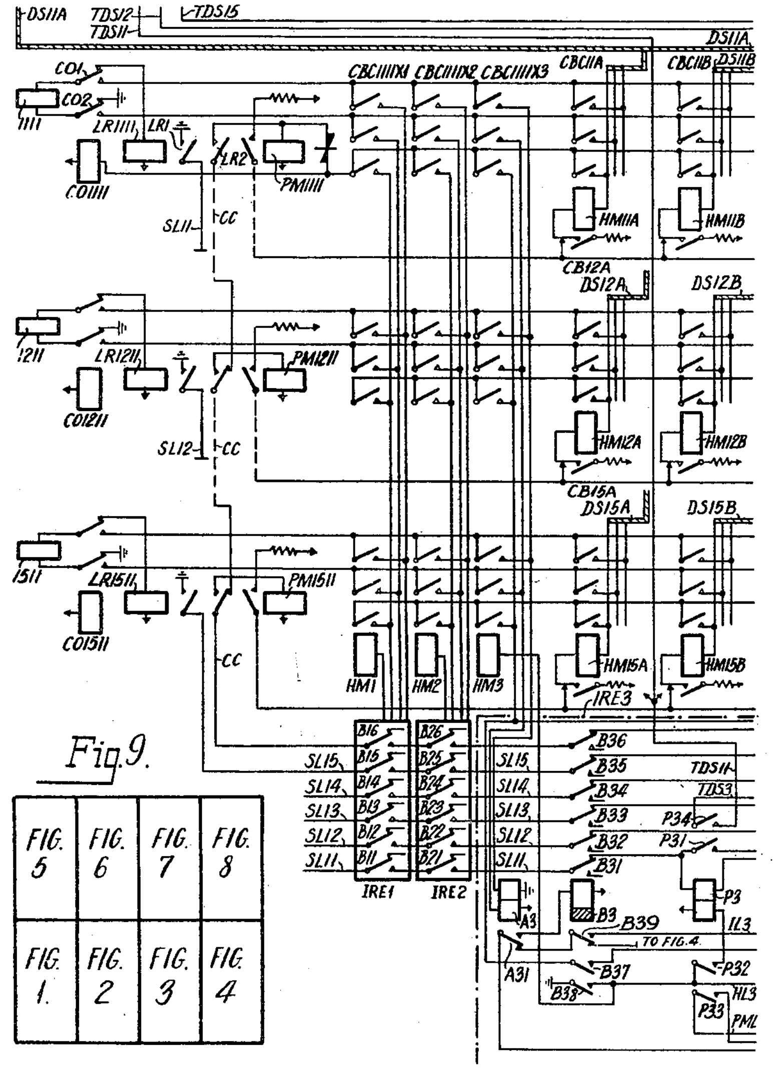
Fig. 1 shows three subscriber's line circuits, a diagrammatic representation of two of the impulse responders and a part of the third, as well as a part of a crossbar switch employed for associating a subscriber's line with an impulse responder and a two-digit switch.
Figure 2:
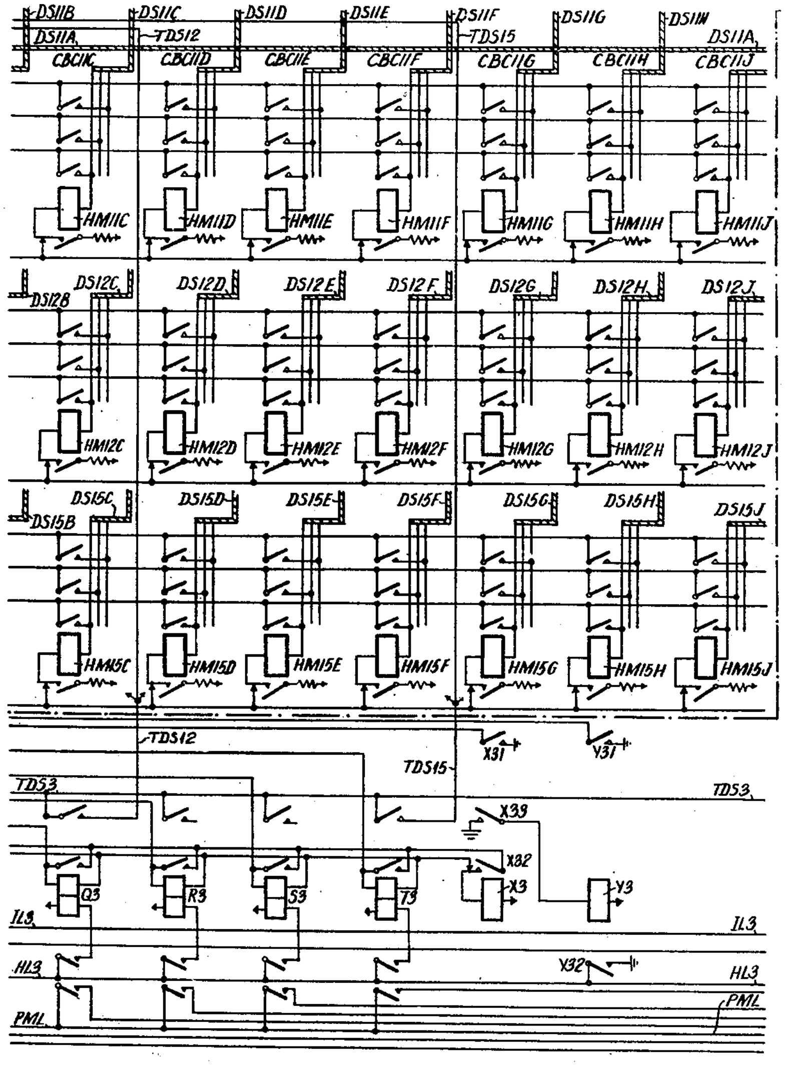
Fig. 2 shows a further part of the impulse responder partially shown by Fig. 1 and also a further part of the crossbar switch.
Figure 3:
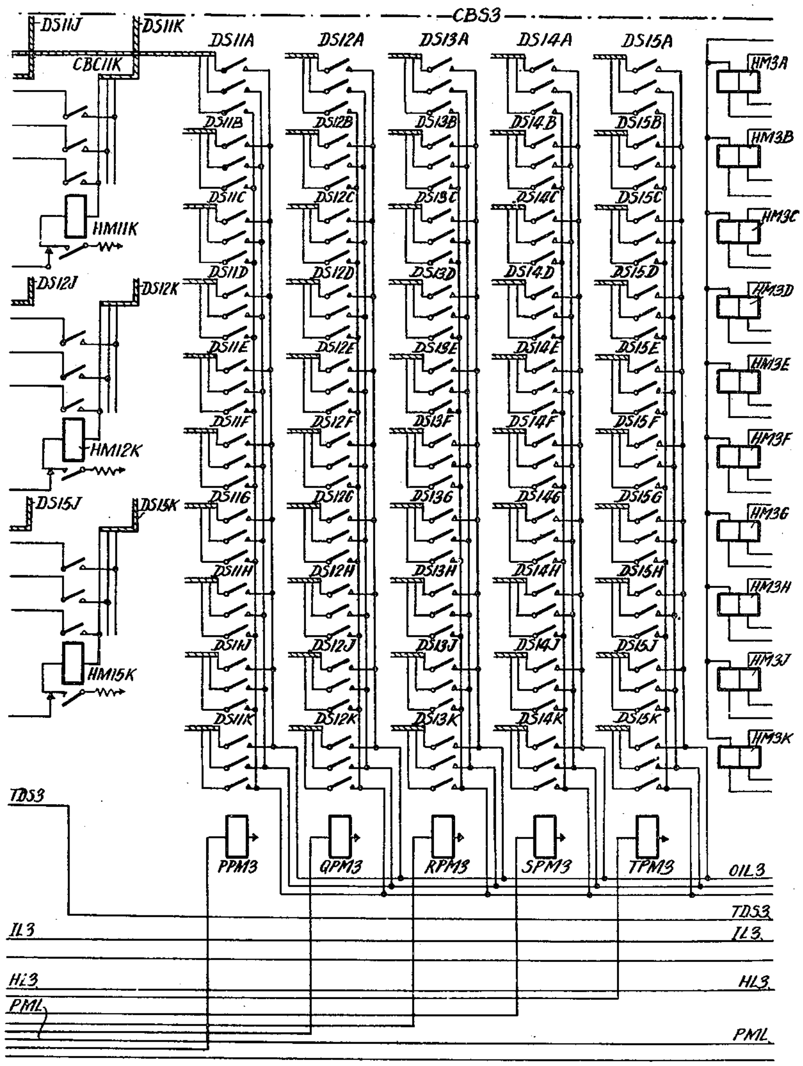
Fig. 3 shows the final part of the crossbar switch and a further part of a third impulse responder including part of a crossbar switch therein.

Fig. 9 shows the arrangement of each of Figs. 1 through 8 relative to each other for analysis.

Referring to Fig. 1 of the drawings, three subscribers' lines are represented, namely No. 1111 representing the first line of the 1100 group, No. 1211 representing the first line of the 1200 group and 1511 representing the first line of the 1500 group. It is assumed that these are three of 10,000 lines connected to the exchange, each line being represented by four digits and the lines being numbered as is generally customary from 1111 to 0000. The lines are divided into 100 line groups each of which groups has access to a group of two-digit selectors e. g. DS11A–K, DS12A–K, DS15A–K and it is assumed, by way of example, that there are 10 two-digit selectors in a group although this may be varied in accordance with the traffic.

The lines are further divided into groups of 500 lines each of which groups has access to three impulse responding equipments 1RE1, 1RE2, 1RE3. The division of lines into and the size of the groups may be varied as desired and also the number of impulse responding equipments per group. Access is had from the individual lines to the impulse responding equipments 1RE1, 1RE2, 1RE3 and to the two-digit selectors DS11A and so on by means of crossbar equipment. This crossbar equipment is only shown diagrammatically for convenience as units of very much larger size would be used in practice.

In this crossbar equipment the prefix PM is used to indicate the prepare magnet which is first operated to select a row of contacts in the crossbar equipment and the prefix HM is used to indicate the hold magnet which is operated subsequently and serves to select a particular set of contacts in the selected row, to effect the operation of such selected contacts and to hold such contacts operated independently of the prepare magnet which can then be used for another selection.

It will be noted that there are three hold magnets HM1, HM2, HM3 having suffixes corresponding to the suffixes of the impulse responding equipments 1RE1, 1RE2, 1RE3 to which they respectively give access, these hold magnets being individual to the 500 lines 1111 to 1500. Further there are 10 hold magnets HM11A–HM11K having suffixes corresponding to the suffixes of the two-digit switches DS11A–DS11K to which they respectively give access. The hold magnets HM11A–HM11K serve the group of 100 lines whose numbers commence with the digit 11. There is one set of hold magnets for each 100 lines of which the hold magnets HM12A–HM12K serve the group of 100 lines whose numbers commence with the digit 12 and hold magnets HM15A–HM15K serve the group of 100 lines whose numbers commence with the digit 15.

Assume substation No. 1111 initiates a call, a circuit, which is not shown in its entirety, is completed for LR1111 which energises and at contact LR1 connects earth to start lead SL11 which is common to all substations, the first two digits of whose numbers is 11. For convenience lead SL11 is interrupted on the drawing but it is to be considered as joined to the corresponding lead extending to 1RE1 and if 1RE1 is busy, it is extended by hold relay B1 of 1RE1 to 1RE2. Contacts B11–B16 only of relay B1 are shown, the relay corresponding to B3 of 1RE3. If 1RE2 is busy it is extended by hold relay B2 of 1RE2 to 1RE3. Again contacts B21–B26 only of relay B2 are shown, the relay corresponding to B3 of 1RE3.

For this description it will be assumed that 1RE3 is idle so that earth on SL11 is extended over back contact B31 to upper winding of relay P3, contact X32, relay X3 to battery. Relays P3 and X3 operate. Relay X3 at X32 completes a circuit for itself over contact P31 to SL11 independent of upper winding of P3 while at X33 it closes a circuit for Y3 which operates and at Y32 closes a locking circuit for the lower winding of relay P3 which becomes effective before the opening of the circuit through the upper winding on the operation of X32. In addition relay X3 at X31 connects earth over chain circuit CC through front contacts B26 and B16 of busy impulse responsive equipments 1RE2 and 1RE1 and back contacts of all line relay contacts which are not operated and form part of CC, to the first operated contact which it is assumed is LR2 of relay LR1111 and thence to prepare magnet PM1111 and battery. Prepare magnet PM1111 thus operates. When relay Y3 operates as described above at contact Y32 it completes a circuit for hold magnet HM3. HM3 operates and due to the prior operation of PM1111, crossbar contacts CBC1111X3 are operated. Over the lower contact a circuit is completed from contact Y31 for cut-off relay CO1111 which at contacts CO1 and CO2 opens the circuit of line relay LR1111 and connects substation No. 1111 through the upper contacts of CBC1111X3 to line relay A3 in impulse responding equipment 1RE3. Relay A3 operates and at contact A31 completes a circuit for relay B3. Relay B3 operates and at contact B37 provides an alternative holding earth to that of contact Y31 for relay CO1111 and hold magnet HM3. At contacts B31–B35 it opens the circuits of the upper windings of relays P3 to T3 whichever has been operated (in this case P3) and if a fourth impulse responding equipment was employed it would extend the start leads SL11 to SL15 incoming to 1RE3 to such equipment. At contact B36 it opens the circuit of PM1111 which releases without however affecting the operated contacts CBC1111X3. Relay P3 is maintained energised over its lower winding, contact P32 and contact B38 to earth. At contact B31 the circuit for the upper winding of relay P3 and of relay X3 is opened. Relay X3 deenergises and opens circuit of relay Y which releases. If a call had originated in any of subscribers' line groups 1211–1200, 1311–1300, 1411–1400, 1511–1500 then the corresponding one of the relays Q3, R3, S3, T3 would have been operated. Otherwise the circuit operations would have corresponded exactly to those described with reference to relay P3.

It will be appreciated that all these operations have taken place in a very short interval of time so that even if another call had originated in the interval so that it might seize the equipment whose selection had first been effected by line 1111, the next idle equipment would almost immediately have become available for line 1111. Dial tone is conveniently connected in the usual way by a contact of B3 (not shown) and subsequently removed when dialling commences for instance, by off-normal contacts of the two-digit switch DS3. The subscriber now commences to dial. Relay A responds to each series of impulses and at back contact A31 impulses are sent via operated contact B39 and lead IL3 to an impulse regenerator DR3 preferably of the type described in British Patent No. 458,095 corresponding to United States Letters Patent No. 2,188,461, granted January 30, 1940, and through relay C3, back contact of relay ID3 to vertical magnet VM3 of two-digit switch DS3. The series of impulses is stored in DR3 and VM3 steps the wipers of DS3 to a level corresponding to the digit dialled.

Relay C3 in operating completes a circuit for the lower winding of ID3 which operates sufficiently to close its "X" contacts only. At the end of the series of impulses when C3 releases the two windings of ID3 operate in series from hold lead HL3 and all the contacts of ID3 operate. The next series of impulses then pass over IL3, relay C3, contacts of ID3 and 2D3 to the rotary magnet RM3. The wipers of DS3 are thus set to a position corresponding to the first and second digits dialed. As examples the contacts representing 11, 22, 33, 44, 55 are shown and are connected up to test leads TL11, TL22, TL33, TL44, TL55 which give the busy or idle condition of all the final selectors of the groups having the first two digits 11, 22, 33, 44 or 55 respectively. Relay C3 operates for the duration of the second series of impulses whereby 2D3 partially operates to close its "X" contacts. When C3 releases 2D3 operates fully, opening the circuit of RM3 so that the third and fourth digits only affect DR3 where they are stored until required. Relay 2D3 is held energised from HL3 and connects up wiper W3 and test lead TDS3 to common operate lead COL3 for the crossbar switch CB3 in the impulse responder IR3, the connections including rectifiers R3A and R3B respectively for a purpose to be described later. Finally relay 2D3 at its lower outer contacts applies earth to lead PPML which extends over contacts P33 to prepare magnet PPM3 of the crossbar switch CBS3. This magnet therefore operates.

Figure 7:
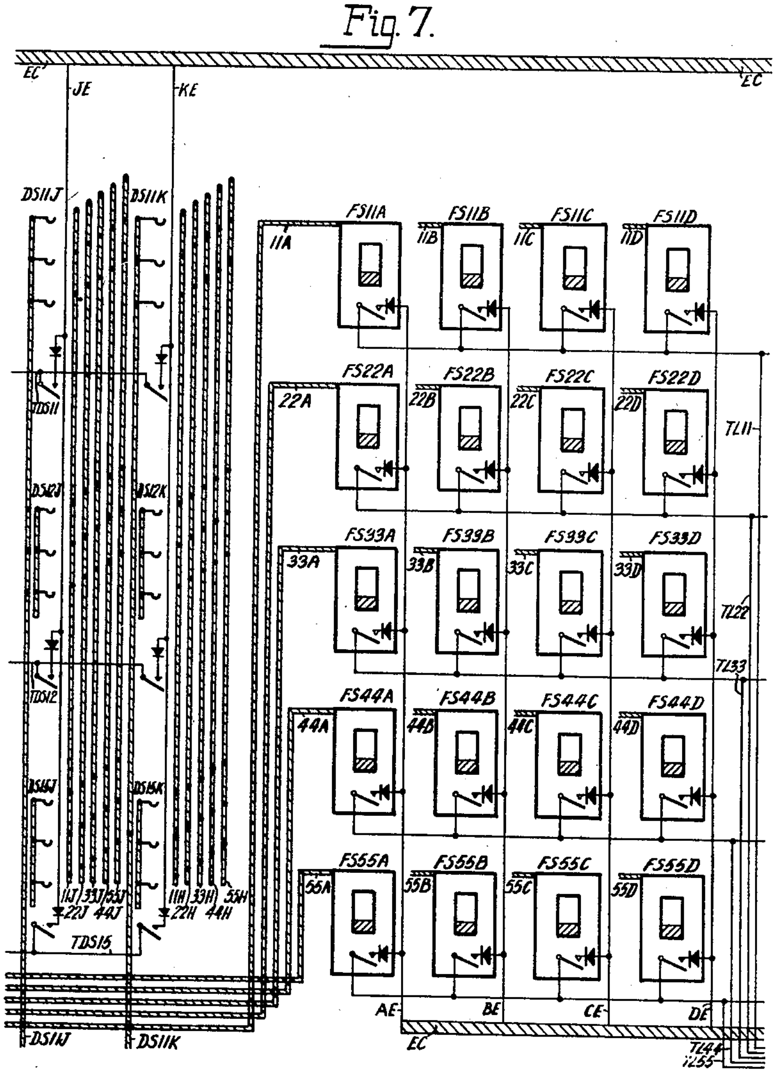
Fig. 7 shows diagrammatically two further two-digit selectors and four final selectors.

Referring to Figs. 7 and 8 it will be noted that each of the final selectors FS11A–FS11K, FS22A–FS22K, FS33A–FS33K, FS44A–FS44K, FS55A–FS55K is represented by a rectangle and includes a relay representing the hold relay of the final selector which is maintained operated whenever the final selector is in use.

The final selectors may be of any known type which respond to the two final digits and have battery feeding facilities, except that they are provided with an additional contact set on the hold relay which is shown together with its connections.

Each of the fixed contacts of the sets are connected to bus-bar leads from the bus-bar cable EC common to the exchange and comprising as many conductors of negligible resistance as there are final selectors in a group. In the case illustrated this is 10 indicated by the suffixes A–K.

Figure 4:
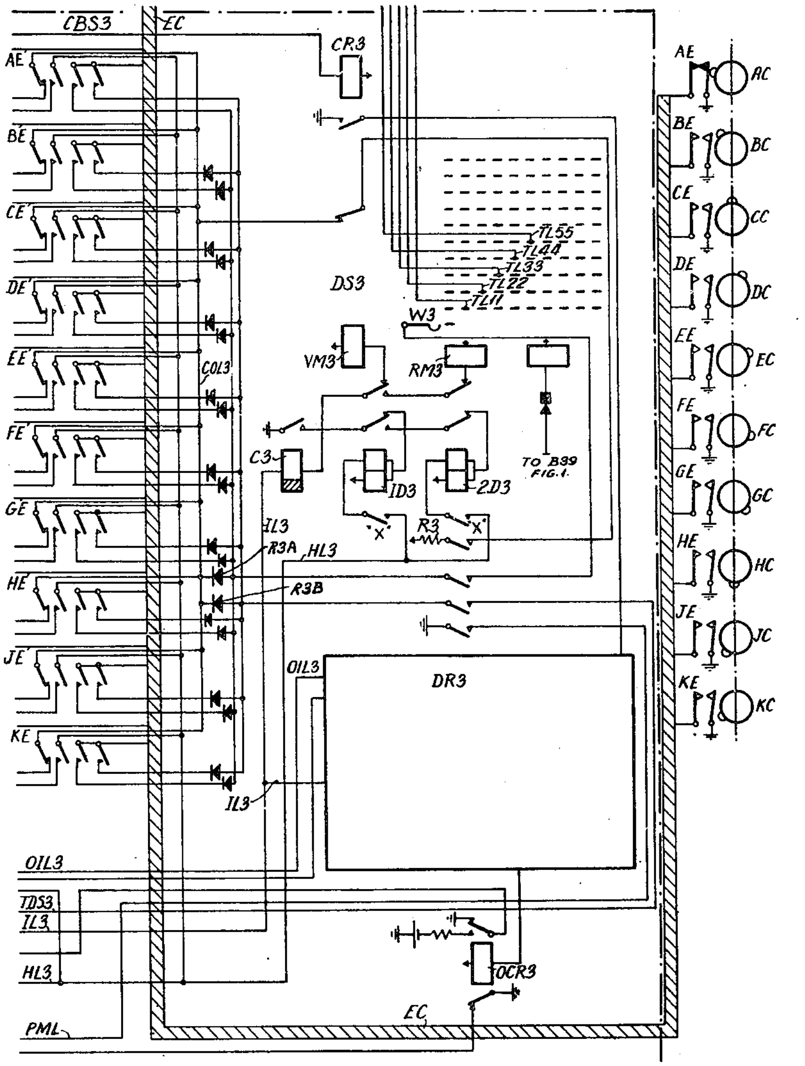
Fig. 4 shows the final part of the third impulse responder including the final part of the third crossbar switch and a two-digit switch which responds to the dialled impulses in addition to which there is shown a set of cams for generating cyclic pulses.

Referring to Fig. 4 it will be seen that there are ten leads marked respectively AE–KE forming part of a cable EC which may be traced over the various figures for the purpose of enabling connections to be made as described hereinafter to each of the two-digit selectors and to each of the final selectors the connections being such that the lead and switch connected together have the same reference letter as the reference letters A–K associated with their designations. A common driven set of cams AC–KC are arranged to close associated contacts at instants in a cycle when no other associated contacts are closed. For instance in the drawing AC is shown at an instant when earth is connected to lead AE. Shortly after, the associated contacts open to remove earth from AE and cam BC becomes effective to close the associated contacts and apply earth to load BE. When these contacts open and earth is removed from BE, contacts associated with CC close and earth is connected to CE and so on until earth is connected to KE. When earth is removed from KE, earth is connected again to AE and so the connections are repeated cyclically. The motor driving the cams can be operated continuously or have its motion initiated on a call. Instead of cam driven interrupters, a chain of relays may be employed arranged to operate successively in a cycle. As regards reliability of operation speed is immaterial provided the contacts are closed long enough to permit operation of a relay, say 20 milliseconds, to leave a reasonable margin of safety.

Figure 5:
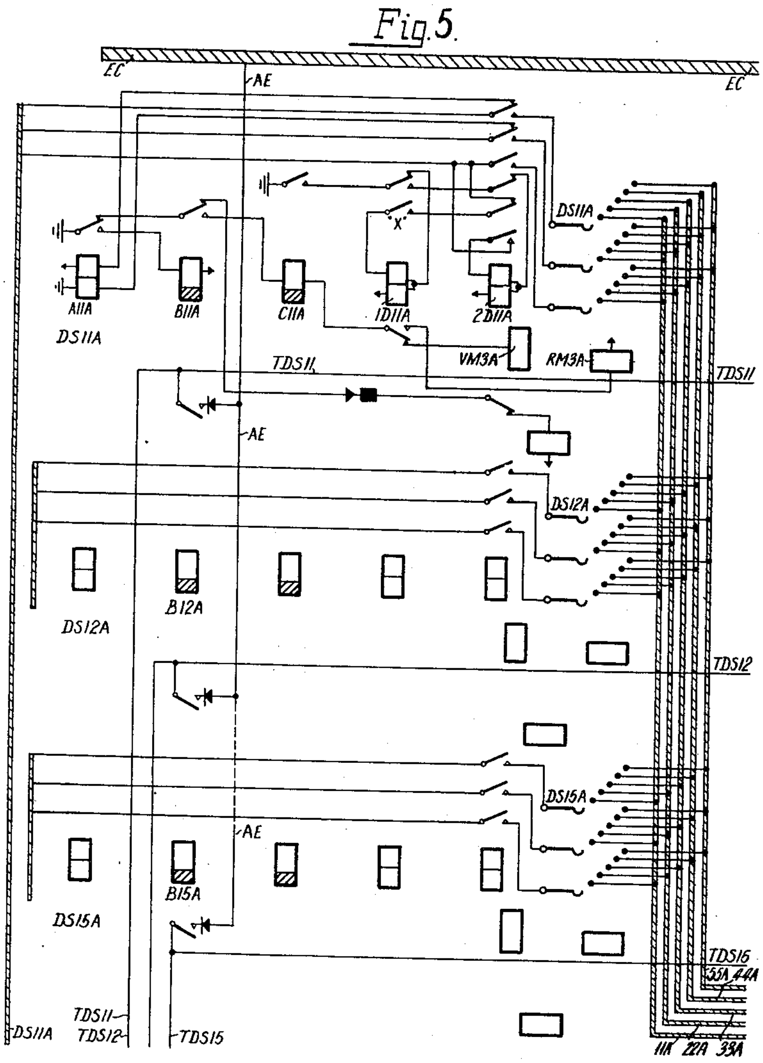
Fig. 5 shows three two-digit selectors.
Figure 6:
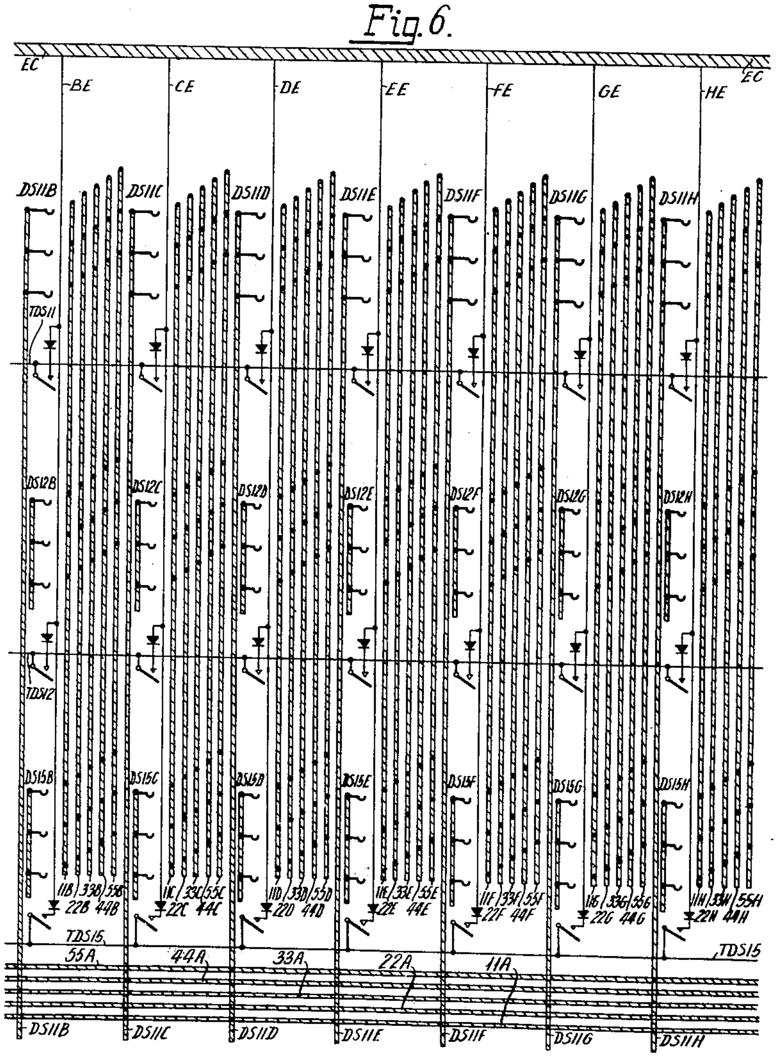
Fig. 6 shows diagrammatically seven further two-digit selectors.

It will be noted that the cable EC extends to Fig. 8 where it forks, one branch extending through Figs. 7, 6 and 5 to illustrate the manner in which connections are made to the two-digit selectors. In Fig. 5 lead AE is shown extended to switches DS11A, DS12A, DS15A so that when the hold relay of any of these switches is operated an intermittent earth is connected to the test lead for all two-digit switches associated with a particular group of lines. For instance, if hold relay B11A of switch DS11A is operated, earth is connected at an instant of time of the cycle of the cams which may be referred to as instant A, to lead TDS11 which is common to all the two-digit switches associated with the group of lines having the initial digits 11. Similarly if either hold relay B12A or B15A is operated then earth is connected to test leads TDS12, TDS15 respectively at instants A in the cycle. On the other hand if any of the two-digit switches DS11B to DS11K is operated then the hold relays of these switches will connect up leads BE to KE respectively to test lead TDS11 so that at instants B to K respectively in the cycle, earth is connected up to TDS11. For convenience in switches DS11B–DS11K in Figs. 6 and 7 only the contacts of the respective hold relays are shown, the circuits of each of these switches being otherwise identical with that of DS11A shown in full in Fig. 5 Similarly the operation of the hold relays of any of the switches DS12B–DS12K will cause a corresponding one of the leads BE–KE to be connected to test lead TDS12 and the operation of any of the hold relays of any of the switches DS15B–DS15K will cause a corresponding one of the leads BE to KE to be connected to test lead TDS15.

As switches DS11, DS12 and DS15 only illustrate by way of example all the two-digit switches in the exchange of say 10,000 lines, it will be appreciated that connections similar to those described above are made to every two-digit switch in the exchange.

The other branch of EC extends to the final selector switches FS11A–FS11K, FS22A–FS22K, FS33A–FS33K, FS44A–FS44K, FS55A–FS55K. The hold relays of these final selector switches are provided with an extra contact over which connections similar to those described with reference to the two-digit selectors, are completed when the hold relay is operated. Thus AE is connected up to test leads TL11, TL22, TL33, TL44, TL55 if any of the final selectors FS11A, FS22A, FS33A, FS44A, FS55A respectively (i. e. any final selector having the suffix A) is busy; BE is connected to the same test leads if any one of the final selectors FS11B, FS22B, FS33B, FS44B, FS55B is busy and so on. Another branch of EC extends to the hold magnets of crossbar switch CBS3 for a purpose to be explained later.

The switching arrangements according to the present invention are such that two-digit switches having the suffix A have access only to final selectors having the suffix A, two-digit switches having the suffix B have access only to final selectors having the suffix B and so on. Consequently a call from any subscriber has a choice of as many distinct routes as it has access to two-digit switches each of which routes is indicated by the suffix letters A–K while the number may be increased according to traffic requirements. In the case of unequal distribution of traffic it is possible to arrange that two-digit selectors accessible from different groups of lines may have access to different sets of final selectors or that final selectors of a group may be accessible from different sets of group selectors. For instance, if the traffic for group 1100 was very light then the number of two-digit switches from that group may be reduced, say to A–G, while if traffic to other groups was also light then the number of two-digit switches from those groups may be arranged also to use only part of the groups A–K so that traffic is distributed. Similarly if the traffic to group 1100 was light the number of final selectors could be reduced and if reduced to routes A to G then reductions of final selectors in other groups where possible would be so arranged as to distribute the reduced traffic over the whole of the routes.

It is not felt desirable in the present description to do more than indicate the various possibilities as the invention will be better understood by referring to the specific examples illustrated in which the traffic is assumed to be fairly equally distributed to each 100 line group.

Referring to Fig. 1 it will be seen that crossbar contacts CBC11A give access to a cable DS11A extending to Fig. 5 to the two-digit switch having the same reference DS11A. Switch DS11A is shown as having five sets of contacts, namely those representing the pairs of digits 1, 1; 2, 2; 3, 3; 4, 4; 5, 5. Each set of contacts is shown connected to a cable, contact 11 being connected to cable 11A, contact 22 to cable 22A, contact 33 to cable 33A, contact 44 to cable 44A and contact 55 to cable 55A. These cables extend over Fig. 6 to Fig. 7 where they terminate on final selectors FS11A, FS22A, FS33A, FS44A, FS55A respectively. Similar cables may be traced from CBC11B to CBC11K except that for clearness the cables 11B–55B, 11C–55C and so on are broken off on Figs. 6 and 7 and continue on the right of Fig. 7.

Again similar cables may be traced from CBC12A and CBC15A and other crossbar contacts in which the suffix letters are changed but in this case the cables DS12A and DS15A and so on are also broken on Figs. 2 and 3 and resumed again on Figs. 6, 7 and 8.

Resuming the description of setting up a call, it will be assumed that the number called is 1167, so that the wiper of DS3 rests on contact 11 after the first two digits are dialled. Consequently test lead TL11 is connected up to COL through R3A when relay 2D3 operates fully so that earth is connected to COL at any of the instants A–K corresponding to those switches FS11A–K which are busy. Test lead TDS3 is connected up at P34 to test lead TDS11. It is to be noted that relay P operated over SL11 because the call originated in group 1100. If it had originated in group 12 or 13, 14 or 15 relays Q, R, S or T respectively would have been operated and test leads TDS12, 13, 14 or 15 respectively would have been connected up. Earth is thus transmitted over test lead TDS11 to COL at any of the instants A–K corresponding to those switches DS11A–K which are busy.

Referring now to the crossbar switch CBS3 it will be noted that there are five prepare magnets PPM3, QPM3, RPM3, SPM3, TPM3 corresponding to each of the relays P, Q, R, S and T respectively and dependent upon which of the relays P, Q, R, S or T are operated. The circuit for their operation may be traced from earth, contact of 2D3 over lead PML, via an operated contact of one of the relays P, Q, R, S and T such as P33 to the corresponding one of the prepare magnets PPM3, QPM3, RPM3, SPM3, or TPM3. As previously described prepare magnet PPM3 is operated in the call under consideration. The crossbar switch CBS3 also has ten hold magnets HM3A–K and gives access to the switches DS11A–K, DS12A–K, DS13A–K, DS14A–K, DS15A–K over the cables shown having the same references.

Referring to the hold magnets HM3A–K it will be noted that the right-hand winding of each magnet is connected at one terminal to a corresponding one of the leads AE–KE of the cable EC, while the other terminal is connected over a back contact of the corresponding magnet to lead COL3. Battery via resistance R3 and contacts of 2D3 and CR3 is connected to COL3. At the instant A in the cam cycle it will be seen that earth is connected over AE, right-hand winding of HM3A, back contact of HM3A, lead COL3, contact of CR3 and 2D3, resistance R3 to battery. Magnet HM3A would operate to close its "X" contact provided that there is no earth connected to COL via unidirectional resistances R3A or R3B from DS11A and FS11A due to either of these switches being busy. At instant B similar circuit conditions become effective for magnet HM3B which will operate unless either of the switches DS11B and FS11B are busy and so on for instants C to K. In the present case it may be assumed that DS11A and FS11A are both free and magnet HM3A closes its "X" contact and completes a circuit for its left-hand winding from earth on HL3 from relay B3 through the "X" contact and left-hand winding of magnet HM3A in series with relay CR3 to battery. Magnet HM3A operates fully as also does relay CR3. Relay CR3 opens the connection of battery to COL to prevent operation of any other of the magnets HM3B–K. HM3A in conjunction with PPM3 closes the crossbar contacts connecting the output impulse leads OIL3 to the speaking leads of DS11A (see Fig. 5) and also connects the hold lead HL3 to the hold lead of DS11A.

It is important to prevent either DS11A and FS11A being seized from other impulse responding equipments during subsequent testing cycles and to ensure this the operation of magnet HM3A over its extreme right-hand contacts connects lead AE to the side of R3A and R3B respectively remote from COL3 so that at the instant A earth is placed on leads TDS11 and TL11 by HM3A to give a busy test to other impulse responders although the hold relay of switches DS11A and FS11A may not yet have operated. Magnet HM3B would, of course, similarly connect up BE if switches DS11B and FS11B had been selected and so on. The result is that immediately HM3A is operated, DS11A and FS11A are busied and remain busied from the impulse responding equipment as long as this is in use when the busying function is completely taken over by the switches themselves in the usual way.

When it is known that switches DS11A and FS11A are free, the impulse regenerator DR3 can begin to send out impulses. This is initiated on the operation of relay CR3 which completes an obvious circuit to the impulse regenerator. The effect of the closing of this circuit is to complete a loop in DR3 across the outgoing impulse conductors OIL3 which loop is extended over contacts DS11A of the crossbar switch CBS3, cable DS11A to switch DS11A (Fig. 5) and thence over back contacts of relay 2D11A to relay A11A. Relay A11A operates and completes a circuit for B11A which energises and prepares an impulsing circuit which, when A11A releases on receipt of impulses from the impulse regenerator DR3, is completed through C11A, back contact of 1D11A to vertical magnet VM3A. As a result the wipers of DS11A are stepped to a level corresponding to the first digit while C11A closes a circuit which causes 1D11A to close its "X" contacts.

At the end of the first series of impulses relay C11A releases to enable 1D11A to operate fully from earth on hold conductor, back contact of 2D11A and its "X" contact. The impulsing circuit is thereby transferred to the rotary magnet RM3A which responds to the second digit from DR3 while due to the reoperation of C11A, relay 2D11A is partially operated to close its "X" contacts. The wipers of DS11A are now set to a position corresponding to the first and second digits in this case 11, and as 2D11A is fully operated on completion of the second series of impulses, the circuit from 1RE3 is transferred to the switch FS11A connected to contacts 11 of switch DS11A.

The next two digits from DR3 are caused to operate the final selector switch FS11A in known manner. As previously explained, the circuits of the final selector can follow any known design and may be P. B. X final selector or regular final selectors as circumstances may indicate. It is also assumed that the final selector circuit includes battery feeding for calling and called subscribers and also means for testing idle or busy conditions and for giving ringing or busy signal accordingly. It is not necessary to describe a circuit of a final selector in detail as there is nothing necessarily novel therein except the additional contact on the B relay.

When the impulse regenerator has sent out the last series of impulses relay OCR3 is operated. OCR3 on operating connects booster battery in place of earth on the hold conductor extending back through contacts B37, CBC1111X3 to non-linear resistor NLR1111, prepare magnet PM1111 to battery. Booster battery has no effect on CO1111 except to increase the holding current. Non-linear resistor NLR1111 is such that it has a high resistance under normal condition as PM1111 cannot operate with earth on the hold wire nor can it be held operated, but when booster battery is connected to the hold wire the resistance falls to a low value to enable PM1111 to operate. PM1111 on operating not only performs the usual function of a prepare magnet but also connects battery through a resistance to a lead common to the hundred line group to which PM1111 belongs and thence in common to the magnets HM11A–K. As the hold wire of each of the switches DS11A–K is connected to the corresponding magnet HM11A–K it follows that any of the magnets HM11A–K connected to an earthed hold wire will operate and lock operated independent of the battery fed from the PM1111 contact. In this case HM11A will operate and cause in conjunction with PM1111, the closure of crossbar contacts CBC11A whereby the calling subscriber is connected direct to DS11A and thence to FS11A. In addition, relay OCR3 in operating removes earth from A31 to cause B3 to release shortly after. When B3 releases, HM3 is released together with relay P and other relays and magnets which are locked to the hold conductor HL3. Consequently 1RE3 is restored to normal in readiness for another call.

The following additional features not illustrated in the circuits could be provided to meet various contingencies as may arise. Firstly if a subscriber delays to dial or to complete dialing, a timing device set in operation on seizure of an impulse responding equipment could establish circuit conditions at the end of a given time after seizure to cause the calling subscriber to be switched off so as to make the impulse responding equipment available for other calls. For instance, it may be switched over by an additional crossbar contact and hold magnet like HM11A–K. Secondly if it is desired to safeguard against two simultaneous operations for selecting a pair of DS and FS switches, the battery feed on which the selecting operation is effective may be fed through a chain circuit common to all the impulse responding equipments in an exchange and controlled by the respective relays corresponding to 2D3 and CR3 in each equipment, so that only one operation can take place at a time. The delay if any would be very short indeed.

Thirdly if it is desired to safeguard against the simultaneous operation of a hold magnet individual to an impulse responding equipment such as HM1, HM2, HM3 and a hold magnet corresponding to a two-digit switch such as HM11A–K, HM12A–K, HM15A–K due to the different operations of prepare magnets, this can be done for instance by making the operation of a magnet HM1, HM2, HM3 common to a group of subscribers (in this case 500) dependent upon the non-operation of a relay equivalent to OCR3 in any impulse responding equipment of the group.

The release of a connection takes place when the calling subscriber replaces his receiver whereupon the impulse-responding relay in the final selector releases followed by the hold relay. The hold relay disconnects earth from the P wire as a result of which relay 2D11A in the two-digit selector DS11A releases and closes a circuit for the release magnet ZM3A over operated off-normal contacts N. The disconnection of earth from the P wire also causes the release of the hold magnet HM11A and the cut off relay CO1111 and the equipment is released.

It will be appreciated that two directional or two-digit switches have been described to illustrate the principles of the invention but the invention is not to be construed as limited thereto. For instance instead of the two-digit switches described, two separate switches each responsive to a digit and having ten positions only instead of 100 could be used. Such switches would be arranged similarly to the arrangement described in connection with the two-digit switches and the final selectors and in order to determine an idle through route it would be necessary to have the two directional switch in the impulse responder connect up to a lead corresponding to the first digit dialled to ascertain which of the outlets of the various first digit switches corresponding to the first digit were available as well as a lead corresponding to the first two digits dialled which is similar to that described to indicate which of the final selectors corresponding to the first two digits dialled are available.

It will be appreciated that this can readily be attained by providing an extra wiper and bank of contacts on the two directional switch and the impulse responder and connecting the wiper through a unidirectional resistor to the common lead COL. The means of indicating the idle or busy condition of switches associated with the lead selected by the extra wiper would be similar to that described in connection with the final selectors.

It is also to be observed that if the single wiper switch associated with the impulse responding equipment was replaced by one having several wipers and means such as a single digit switch or a chain of counting relays were provided for selecting any one of such wipers in response to another digit, then a circuit could be established from a single unidirectional resistance connected to COL to any contact of the two directional switch in response to three digits, one digit to select a wiper and two digits to select a contact in the bank of the selected wiper. Then if test leads were selectable for the single digit switch for groups of single digit switches in the main train as well as from each contact in the two directional switch, it would be possible to adapt the system described to a five instead of a four digit numbering scheme. The single digit switches might precede the two-digit switches in the main train and could serve as junction line selectors, the junction lines like the final selectors being arranged in groups, one junction line being individual to each route. If desired as described in connection with final selectors the two junctions may be allocated to a certain route or one junction to two routes or other combinations to meet traffic requirements.

It will be noted that leads from the bus-bars AE to KE are arranged to pass through unidirectional resistances or rectifiers so as to avoid any of the bus-bars being supplied with potential from another bus-bar through a common lead. Such rectifiers are essential wherever there is more than one connection to be set up but other means could be provided such as individual contacts on the common interrupters for each connection which is likely to be required to be set up.

I claim:

1. A telecommunication system comprising a calling line, a called line, a first first-stage numerical non-hunting multiposition switching device accessible to said calling line, a second first-stage non-hunting multiposition switching device also accessible to said calling line, a first final-stage numerical non-hunting multiposition switching device accessible to said first first-stage multiposition switching device but not to said second first-stage switching device and giving access to said called line, a second final-stage numerical non-hunting multiposition switching device accessible to said second first-stage multiposition switching device and not to said first first-stage switching device and giving access to said called line, a first conductor common to each of said first-stage switching devices, a plurality of second conductors common to each of said final-stage switching devices, called line designation-register means, means for seizing said register means on the initiation of a call on said calling line, a selecting means associated with said register means for selecting one of said second conductors, a cyclic impulse generator by which potential is made available at distinctive instants in a cycle to said conductors, means controlled by each of said first switching devices when busy to cause potential made available at one instant in a cycle by said cyclic generator to be applied to said first conductor, means controlled by each of said first-stage switching devices when busy to cause potential made available at another instant in a cycle by said cyclic generator to be applied to one of said second conductors, a static multiposition switching device whose operation is controlled by potentials applied to said conductors one of which is connected to said static-switching device by said register means and the other of which is connected thereto independently to select an idle first-stage switching device having access to an idle final-stage switching device and means also associated with said designation register means for effecting the operation of the selected first- and final-stage switching device to establish a connection between the calling and called lines.

2. In a telecommunication system, a calling line, a called line connected to an exchange, a first plurality of numerical non-hunting multiposition switching devices forming a first switching stage accessible to said calling line, a second plurality of numerical non-hunting multiposition switching devices forming a second switching stage having access to said called line, a first connecting means by which outlets, corresponding to part of the designation of the called line, of each switching device of the first switching stage are given access to a distinctive switching device of the second switching stage thereby forming a plurality of routes each including a switching device of the first stage and a switching device of the second stage by which connections may be set up from the calling to the called line, a first test lead common to switching devices of the first switching stage in each of said routes, a second test lead common to switching devices of the second stage in each of said routes, a source of potential, cyclic impulse generating means, a plurality of leads corresponding in number to said routes to each of which said source of potential is connected by said cyclic means at an instant in a cycle characterizing the route to which the lead corresponds, a first switching means individual to each of said switching devices of the first stage which connect that one of said plurality of leads to the first test lead at times when the switching device to which it is individual is busy, a second switching means individual to each of said switching devices of the second stage which connect that one of said plurality of leads to the second test lead at times when the switching device to which it is individual is busy, a static multiposition switching device, impulse responding means operable from the calling line to register the designation of a called line and including selecting means by which the second test lead corresponding to part of the designation of the called line is connected to said static multiposition switching device, a second connecting means by which the first test lead is connected to said static switching device, a third connecting means by which said plurality of leads are connected to said static multiposition switching device, operating means for said static multiposition switching device which in dependence upon the potential applied to said first and second test leads selects a route over which switching devices of both the first and second stage are idle and switch controlling means for operating the switching devices on the selected route and completing the connection between the calling and called lines.

3. In a telecommunication system, a first calling line, a second calling line, and a called line connected to an exchange, a first plurality of numerical non-hunting multiposition switching devices forming a first switching stage accessible to said first calling line, a second plurality of numerical non-hunting multiposition switching devices also forming a first switching stage accessible to said second calling line, a third plurality of numerical non-hunting multiposition switching devices forming a second switching stage having access to said called line, a first connecting means by which outlets corresponding to part of the designation of the called line of each switching device of the first switching stage are given access to a distinctive switching device of the second stage thereby forming a plurality of routes each including a switching device of each of said pluralities of the first stage and a switching device of the second stage by which connections may be set up from the calling to the called line, impulse responding means operable from the calling line to register the designation of a calling line, idle-and-busy condition testing means for the switching devices in each route controlled from the calling line in dependence upon the calling line and part of the designation of the called line as determined by said impulse responding means, route selecting means controlled by said idle-and-busy condition testing means to select a route in which a switching device of the plurality to which the calling line has access and a switching device of the plurality having access to the called line are both idle and switch controlling means for operating the switching devices on the selected route and completing the connection between the calling and called lines.

4. An arrangement for use in a telecommunication system, as claimed in claim 3 in which each multiposition switching device of the first stage has only a single outlet connected to multiposition switching devices of the second stage having access to a given called line.

5. In a telecommunication system a first calling line, a second calling line, a third calling line, a plurality of called lines arranged in groups connected to an exchange, a first plurality of numerical non-hunting multiposition switching devices forming a first switching stage accessible to said first calling line, a second plurality of numerical non-hunting multiposition switching devices forming a first switching stage accessible to said second calling line, a third plurality of numerical non-hunting multiposition switching devices forming a first switching stage accessible to said third calling line, a fourth plurality of numerical non-hunting multiposition switching devices forming a second switching stage having access to one group of called lines, a fifth plurality of numerical non-hunting multiposition switching devices forming a second switching stage having access to a different group of called lines, a first connecting means by which outlets corresponding to part of the designation of the called line of each switching device of the first stage are given access to a distinctive switching device of the second stage thereby forming a number of routes each including a switching device of the first stage and a switching device of the second stage by which connections may be set up from a calling to a called line, impulse responding means operable from the calling line to register the designation of a called line, idle-and-busy condition testing means for the switching devices in each route controlled from the calling line in dependence upon the calling line and part of the designation of the called line so determined by said impulse responding means, route selecting means controlled by said idle-and-busy condition testing means to select a route in which a switching device of the plurality to which the calling line has access and a switching device of the plurality having access to the called line are both idle and switch controlling means for operating the switching devices on the selected route and completing the connection between the calling and called lines.

6. In a telecommunication system, a plurality of calling lines connected to an exchange and arranged in groups, a plurality of called lines, a plurality of groups of first stage numerical non-hunting multiposition switching devices to each of which groups a group of calling lines has access, multipied connecting means by which each outlet of each switching device of one group is connected to a single corresponding outlet in each corresponding switching device of the other groups, thereby forming a plurality of routes corresponding to the number of switching devices in a group, later stage multiposition switching devices connected individually to each of said multipled outlets, impulse responding means operated from a calling line to register the designation of a called line, means for testing for the idle-and-busy condition of those multiposition switching devices in each route by which the connection can be set up to the called line as designated by said impulse responding means, switching means under control of said testing means by which the calling line is connected to a first-stage multiposition switching device of a route which has been found to be available to set up the desired connections and operating means for controlling successively the operation of said first- and later-stage multiposition switching devices allocated to the route selected to set up a connection to the desired called line.

7. In a telecommunication system, a first calling line, a second calling line, a third calling line connected to an exchange, a plurality of called lines, a first plurality of numerical non-hunting multiposition switching devices forming a first switching stage accessible to said first calling line, a second plurality of numerical non-hunting multiposition switching devices forming a first switching stage accessible to said second calling line, a third plurality of numerical non-hunting multiposition switching devices forming a first switching stage accessible to said third calling line, further pluralities of numerical non-hunting multiposition switching devices forming a second switching stage having access to said called lines, a first connecting means by which outlets corresponding to part of the designation of a called line of each switching device of the first stage have access to a distinctive switching device of the second stage thereby forming a plurality of routes each including a switching device of the first stage and a switching device of the second stage by which connections may be set up from a calling to a called line, idle-and-busy condition testing means for ascertaining the condition of each multiposition switching device of the first stage to which the calling line has access and each multiposition switching device of the second stage to which the called line has access, a crossbar switch having a number of prepare magnets and a number of hold magnets, impulse responding means operable from the calling line to register the designation of a called line and including selecting means, a connecting means by which the magnets of the crossbar switch are controlled by said condition testing means as selected by the selecting means to determine a route including a switching device of the first and second stages accessible from the calling line, and switch controlling means for operating the switching devices on the selected route and completing the connection between the calling and called lines.

RICHARD MERCER.

REFERENCES CITED

The following references are of record in the file of this patent:

UNITED STATES PATENTS

| Number | Name | Date |
|---|---|---|
| 1,752,500 | Munchenhagen | Apr. 1, 1930 |
| 1,798,495 | Radke | Mar. 31, 1931 |
| 1,901,177 | Levy | Mar. 14, 1933 |